US011990685B2

(12) United States Patent
Chakravarty et al.

(10) Patent No.: US 11,990,685 B2
(45) Date of Patent: May 21, 2024

(54) COMPUTER CONTROLLED ELECTROMECHANICAL MMW FREQUENCY ANTENNA SCANNING SYSTEM AND BEAM STEERING THEREOF

(71) Applicant: Tata Consultancy Services Limited, Mumbai (IN)

(72) Inventors: Tapas Chakravarty, Kolkata (IN); Aman Kumar, Kolkata (IN); Arpan Pal, Kolkata (IN); Achanna Anil Kumar, Bangalore (IN); Roshan Khobragade, Hyderabad (IN); Poornima Surojia, Hyderabad (IN); Pranay Sahay, Hyderabad (IN); Manish Jain, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 20 days.

(21) Appl. No.: 17/663,241

(22) Filed: May 13, 2022

(65) Prior Publication Data

US 2023/0006346 A1 Jan. 5, 2023

(30) Foreign Application Priority Data

May 27, 2021 (IN) ............................ 202121023515

(51) Int. Cl.
*H01Q 3/08* (2006.01)
*H01Q 3/22* (2006.01)
*H01Q 9/04* (2006.01)

(52) U.S. Cl.
CPC ................. *H01Q 3/08* (2013.01); *H01Q 3/22* (2013.01); *H01Q 9/0414* (2013.01)

(58) Field of Classification Search
CPC ................................................. H01Q 15/0086
(Continued)

(56) References Cited

U.S. PATENT DOCUMENTS 6,812,903 B1 * 11/2004 Sievenpiper ......... H01Q 15/002 343/753
9,972,906 B2 5/2018 Vassilakis
(Continued)

FOREIGN PATENT DOCUMENTS

WO WO 2017/091845 A1 6/2017
WO WO-2017091845 A1 * 6/2017

OTHER PUBLICATIONS

Pablo Cencillo-Abad et al., "Electro-mechanical light modulator based on controlling the interaction of light with a metasurface," Scientific Reports, Jul. 2017, vol. 7(1), Pubmed, https://www.researchgate.net/publication/317377653_Electro-mechanical_light_modulator_based_on_controlling_the_interaction_of_light_with_a_metasurface/link/59727857458515e26dfd937f/download.

(Continued)

*Primary Examiner* — Hoang V Nguyen
*Assistant Examiner* — Brandon Sean Woods
(74) *Attorney, Agent, or Firm* — Finnegan, Henderson, Farabow, Garrett & Dunner LLP

(57) ABSTRACT

This disclosure relates generally to Millimeter Wave (MMW) frequency antenna scanning system. Conventional approaches available for scanning an antenna beam over a large angular swath with high directivity are unable to address concerns of size and cost involved. The technical problem of providing an MMW frequency antenna scanning system using a single small size antenna capable of scanning as desired at a desired precision is addressed in the present disclosure. The antenna scanning system provided is an electromechanical system that makes the system cost effective. Computer control provides precision control in beam steering from remote. Use of a metasurface and configuration of a radiating patch and a shorting pin in a microstrip
(Continued)

antenna addresses the concern with regards to the size of the antenna scanning system.

18 Claims, 11 Drawing Sheets

(58) Field of Classification Search
USPC .................................................. 343/700 MS
See application file for complete search history.

(56) References Cited

U.S. PATENT DOCUMENTS

| | | | | |
|---|---|---|---|---|
| 10,965,031 | B2 * | 3/2021 | Shin | H01Q 25/001 |
| 2001/0013842 | A1 * | 8/2001 | Ishikawa | G01S 13/931 343/773 |
| 2006/0139206 | A1 * | 6/2006 | Nagasaku | H01Q 19/062 342/115 |
| 2019/0363447 | A1 * | 11/2019 | Pelletti | H01Q 15/14 |
| 2022/0190482 | A1 * | 6/2022 | Yang | H01Q 19/062 |
| 2022/0416422 | A1 * | 12/2022 | Shahvirdi Dizaj Yekan | H01Q 15/0086 |

OTHER PUBLICATIONS

Muhammad U. Afzal et al., "A Metasurface to Focus Antenna Beam at Offset Angle," 2nd URSI Atlantic Radio Science Meeting (AT-RASC), Jun. 2018, IEEE, https://www.ursi.org/proceedings/procAT18/papers/Paperv1.pdf.

* cited by examiner

| | | Gain | |
|---|---|---|---|
| Name | Theta | Ang | Mag |
| m1 | -5.0000 | -5.0000 | 8.4365 |
| m2 | 5.0000 | 5.0000 | 8.7883 |
| m3 | 15.0000 | 15.0000 | 9.0186 |
| m4 | 25.0000 | 25.0000 | 9.2941 |
| m5 | 35.0000 | 35.0000 | 9.2863 |

| | | Gain | |
|---|---|---|---|
| Name | Theta | Ang | Mag |
| m1 | -10.0000 | -10.0000 | 7.9459 |
| m2 | 0.0000 | 0.0000 | 7.6190 |
| m3 | 25.0000 | 25.0000 | 7.2258 |
| m4 | 30.0000 | 30.0000 | 6.6657 |

COMPUTER CONTROLLED ELECTROMECHANICAL MMW FREQUENCY ANTENNA SCANNING SYSTEM AND BEAM STEERING THEREOF

PRIORITY CLAIM

This U.S. patent application claims priority under 35 U.S.C. § 119 to: India Application No. 202121023515, filed on 27 May 2021. The entire contents of the aforementioned application are incorporated herein by reference.

TECHNICAL FIELD

The disclosure herein generally relates to antenna scanning systems, and, more particularly, computer controlled electromechanical Millimeter Wave (MMW) frequency antenna scanning system and beam steering for the same.

BACKGROUND

Millimeter Wave (MMW) frequency band of 24 GHz to 28 GHz is being considered quite important for emerging areas of Radio Frequency (RF) sensing (radars in civilian applications) and 5$^{th}$ Generation (5G) deployments in wireless communications. Radar applications range from machine inspection (by measuring vibration), counting people and tracking, and the like. On the other hand, it is envisaged that future 5G deployments will utilize this frequency band for very high data rate. For both the application scenarios, a need exists for scanning an antenna beam over a large angular swath where the antenna beam itself displays high directivity, i.e. narrow beam width rather than using a single antenna with omnidirectional coverage. Omnidirectional antenna has the property of low gain thereby requiring more transmit power; this is critical at MMW frequency bands due to high propagation loss. Moreover, an omnidirectional antenna will pick up radio waves from both the desired object (or user) as well as interfering sources; thereby making detection more difficult.

A standard alternative is to implement electronic scanning of antenna beam using phased-array concept. However, the phased-array concept works well with a narrow band system. An array factor that defines the directivity and beam scanning angle is frequency sensitive. Both values change as the operating frequency changes and therefore the array needs to be reconfigured when the system is wideband. Typically, bandwidth >10% of center frequency. On the other hand, the emerging areas of 5G or ultra-wideband radar expect a frequency bandwidth of greater than 20% or 500 MHz. To introduce frequency independence, conventional concepts like multiband array, a frequency tapered array and an array with varying element sizes and element distances may be employed. Cost and size of the antenna scanning system is a concern with these conventional concepts.

SUMMARY

Embodiments of the present disclosure present technological improvements as solutions to one or more of the above-mentioned technical problems recognized by the inventors in conventional systems.

In an aspect, there is provided a Millimeter Wave (MMW) frequency antenna scanning system comprising: a microstrip antenna positioned horizontally in an XY plane of a Cartesian coordinate system and cooperating with a Radio Frequency (RF) chain to receive and transmit radio waves; a first conducting plate positioned at a first predetermined distance from the microstrip antenna, wherein the first conducting plate is connected to a ground terminal and configured to reflect the radio waves; a metasurface disposed such that a center point thereof is at a second predetermined distance, along a Z-axis in the Cartesian coordinate system, from a radiating face of the microstrip antenna; two or more posts having a first end and a second end, positioned on opposite sides of the first conducting plate, wherein the first end is coupled to the metasurface, and configured to have vertical movement along the Z-axis; and a controller unit in communication with the two or more posts via the second end thereof, wherein the controller unit comprises: two or more motors wherein each of the two or more motors are configured to independently control the vertical movement of an associated post from the two or more posts along the Z-axis, such that the vertical movement results in a tilt of the connected metasurface with reference to an orientation of the microstrip antenna; and one or more data storage devices configured to store instructions; one or more communication interfaces; and one or more hardware processors operatively coupled to the one or more data storage devices via the one or more communication interfaces, wherein the one or more hardware processors are configured by the instructions to: generate a driving voltage for synchronously controlling the two or more motors such that the coupled metasurface tilts with reference to the orientation of the microstrip antenna by an inclination angle for beam steering that provides a predetermined directivity to the microstrip antenna, wherein the beam steering involves steering of beams of the radio waves.

In another aspect, there is provided a processor implemented method comprising the steps of: positioning a microstrip antenna horizontally, in an XY plane of a Cartesian coordinate system, and cooperating with a Radio Frequency (RF) chain (104) to receive and transmit radio waves; positioning a first conducting plate at a first predetermined distance from the microstrip antenna, wherein the first conducting plate is connected to a ground terminal and configured to reflect the radio waves; disposing a metasurface such that a center point thereof is at a second predetermined distance, along a Z-axis in the Cartesian coordinate system, from a radiating face of the microstrip antenna; positioning two or more posts, having a first end and a second end, on opposite sides of the first conducting plate, wherein the first end is coupled to the metasurface, and configured to have vertical movement along the Z-axis; generating a driving voltage, by a controller unit for synchronously controlling two or more motors, wherein each of the two or more motors are configured to independently control the vertical movement of an associated post from the two or more posts along the Z-axis; and performing beam steering by the vertical movement that results in a tilt of the coupled metasurface with reference to an orientation of the microstrip antenna by an inclination angle, to achieve a predetermined directivity associated with the microstrip antenna, wherein the beam steering involves steering of beams of the radio waves.

In accordance with an embodiment of the present disclosure, the first predetermined distance and the second predetermined distance are optimized based on impedance matching, radiation gain and accuracy of the beam steering.

In accordance with an embodiment of the present disclosure, the first predetermined distance is based on a wavelength (λ) corresponding to a frequency of interest and the second predetermined distance is 8 millimeter (mm).

In accordance with an embodiment of the present disclosure, the first predetermined distance is an odd multiple of $\lambda/4$.

In accordance with an embodiment of the present disclosure, the inclination angle is identical to an angle of tilt $\theta$ of a main lobe of a transmitted or received radio waves from the microstrip antenna.

In accordance with an embodiment of the present disclosure, the metasurface is square shaped.

In accordance with an embodiment of the present disclosure, the microstrip antenna is characterized by: a substrate that accommodates a radiating patch on a first surface and a second conducting plate on an opposite surface; sides of the radiating patch and sides of the substrate are separated by a predefined region; a portion of a side of the radiating patch proximate a corner of the radiating patch and extends into the predefined region along two adjacent sides of the substrate, proximate the corner; a feed point disposed at an empirically determined position in the radiating patch; and a shorting pin disposed at an empirically determined position in a portion of the radiating patch that extends into the predefined region.

In accordance with an embodiment of the present disclosure, the substrate is square shaped, and the radiating patch is rectangular shaped.

In accordance with an embodiment of the present disclosure, the two or more motors are stepper motors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
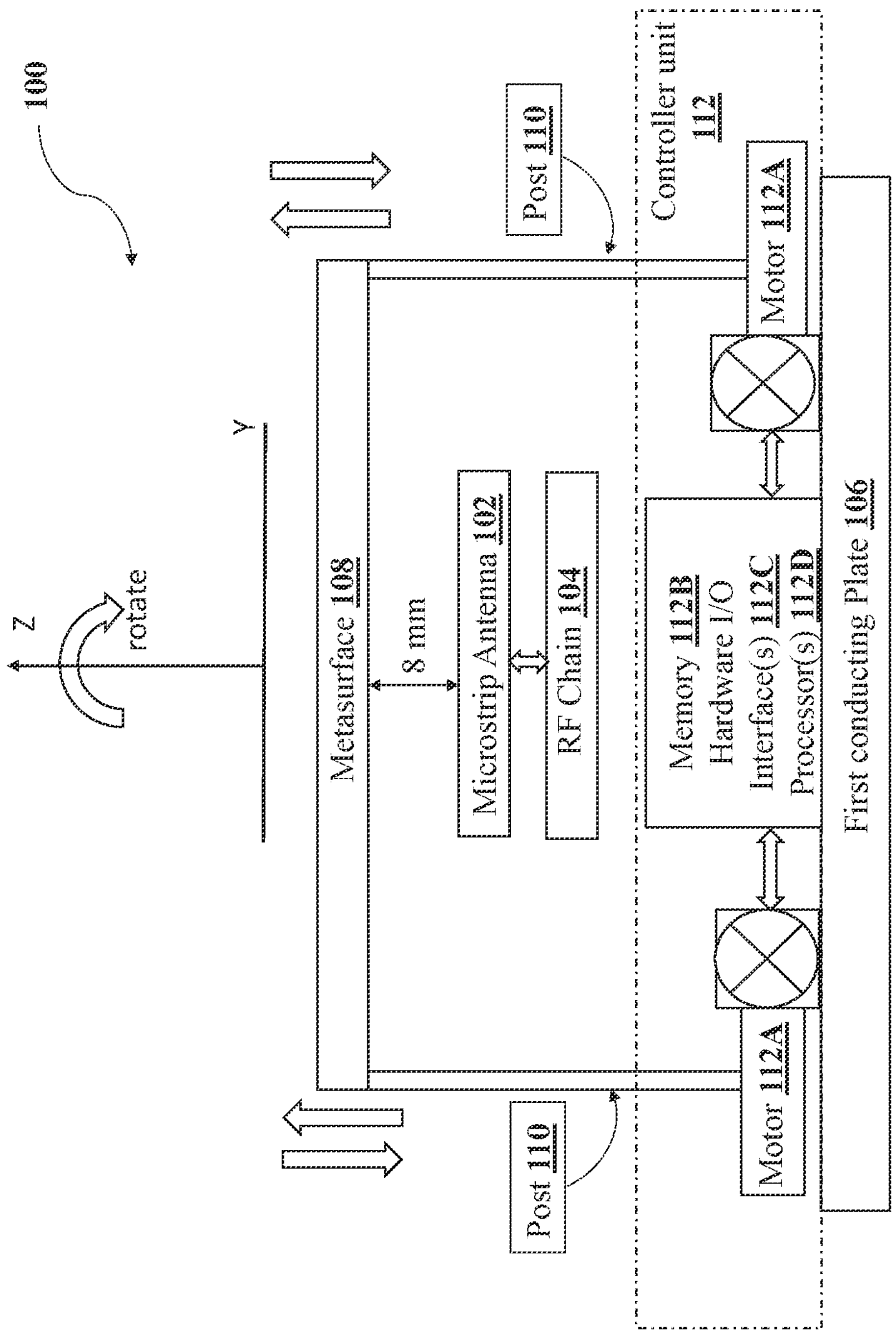
FIG. 1 illustrates an exemplary block diagram of a Millimeter Wave (MMW) frequency antenna scanning system according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The Millimeter Wave (MMW) frequency band of 24 GHz to 28 GHz is gaining importance in Radio Frequency (RF) applications and $5^{th}$ Generation (5G) deployments in wireless communications. Detection by an omnidirectional antenna is less efficient considering it picks up radio waves from interfering sources. To meet the need for scanning the antenna beam over a large angular swath with high directivity, a phased array implementation may be considered. However, the phased array implementation works better with a narrow band system. Alternatives like multiband array, frequency tapered array and arrays with varying element sizes and element distances are cost intensive and size of the antenna scanning system is also a concern.

In a classical consideration for 5G deployment at MMW frequency bands, “small cells” i.e. cells that cover a region of 250 m to 300 m each are required, due to the high propagation losses associated with MMW. Moreover, there are issues involved with obstruction due to buildings, infrastructure where MMW radio waves cannot penetrate the structures. This consideration leads to a practical deployment scenario where thousands of 5G base stations are needed to be installed to cover an urban area. Thus, size and cost of an antenna scanning system is a very important consideration. The technical problem of providing an MMW frequency antenna scanning system using a single small size antenna capable of scanning as desired at a desired precision is addressed in the present disclosure. The antenna scanning system provided is an electromechanical system that makes the system cost effective. Computer control provides the precision control in beam steering from remote. Use of a metasurface and configuration of a microstrip antenna (described later in the description) addresses the concern on the size of the antenna scanning system.

In the context of the subject disclosure, definitions of certain expressions and their usage are as explained herein below.

Metamaterial is an artificial material created by introducing periodic arrangements of small perturbations in a natural material. Metamaterials demonstrate unique properties in light-matter interactions that are not obtained naturally.

Metasurface is a 2-Dimensional representation of the metamaterial. Essentially, it consists of a periodic arrangement of "unit cells" (dimension of each unit cell <<a wavelength (λ) corresponding to a frequency of interest) printed on a Printed Circuit Board (PCB) material like Rogers RT-Duroid® 5880 (dielectric constant or relative permittivity=2.2) or say Flame Retardant material (FR-4) (dielectric constant or relative permittivity=4.4). Any substrate material may be chosen with a sole consideration that the substrate height is less than λ. Metasurface design is configured to manipulate the electromagnetic wave.

The expressions 'PCB' and 'substrate' may be interchangeably used.

The expressions 'inclination angle', 'angle of rotation' or 'rotate' may be interchangeably used.

The expressions x-axis, y-axis and z-axis may be interchangeably represented as X-axis, Y-axis and Z-axis respectively.

φ and phi may be interchangeably used.

θ and theta may be interchangeably used.

Referring now to the drawings, and more particularly to FIG. 1 through FIG. 10, where similar reference characters denote corresponding features consistently throughout the figures, there are shown preferred embodiments and these embodiments are described in the context of the following exemplary system and/or method.

Reference numerals of one or more components of the MMW frequency antenna scanning system as depicted in the FIG. 1 are provided in Table 1 below for ease of description:

TABLE 1

| Sr. No. | Component | Reference numeral |
|---|---|---|
| 1 | Microstrip antenna | 102 |
| 2 | Radio Frequency (RF) chain | 104 |
| 3 | First conducting plate | 106 |
| 4 | Metasurface | 108 |
| 5 | Post | 110 |
| 6 | Controller unit | 112 |
| 7 | Motor | 112A |
| 8 | Data storage device/Memory | 112B |
| 9 | Communication interface | 112C |
| 10 | Hardware processor | 112D |
| 11 | Substrate | 102A |
| 12 | Radiating patch | 102B |
| 13 | Predefined region | 102C |
| 14 | Feed point | 102D |
| 15 | Shorting pin | 102E |
| 16 | Second conducting plate | 114 |

FIG. 1 illustrates an exemplary block diagram of a of a Millimeter Wave (MMW) frequency antenna scanning system 100 according to some embodiments of the present disclosure, according to some embodiments of the present disclosure. In an embodiment, the MMW frequency antenna scanning system 100 comprises a microstrip antenna 102 positioned horizontally in an XY plane of a Cartesian coordinate system and cooperating with a Radio Frequency (RF) chain 104 to receive and transmit radio waves. The RF chain, as known in the art, is a cascade of electronic components and sub-units which may include amplifiers, filters, mixers, attenuators and detectors. Communication signals like baseband signals when modulated to MMW chain are fed via the RF chain 104 to the microstrip antenna 102.

The MMW frequency antenna scanning system 100 further comprises a first conducting plate 106, positioned at a first predetermined distance from the microstrip antenna, wherein the first conducting plate 106 is connected to a ground terminal and configured to reflect the radio waves. In an embodiment, the first conducting plate 106 is a metallic plate. The ground terminal may or may not be same as the ground terminal of the RF chain 104.

Figure 2A:
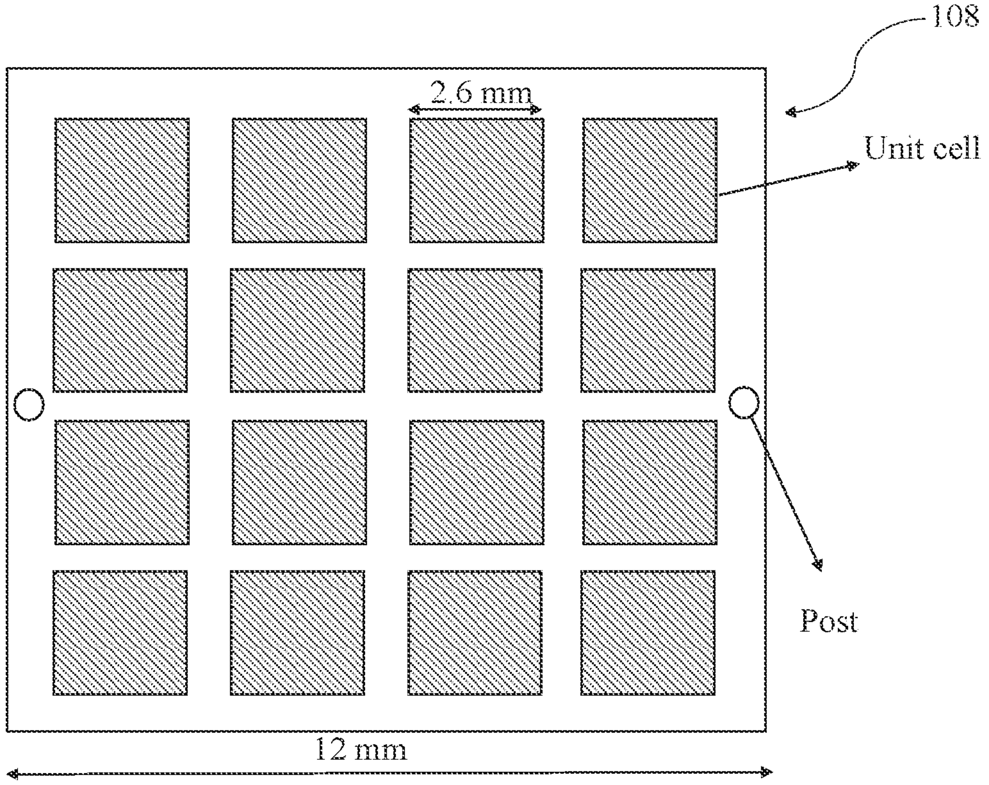
FIG. 2A and FIG. 2B illustrate an exemplary representation (Not to scale) of a top view and a side view, respectively of a metasurface consisting of a periodic arrangement of unit cells according to some embodiments of the present disclosure.
Figure 2B:
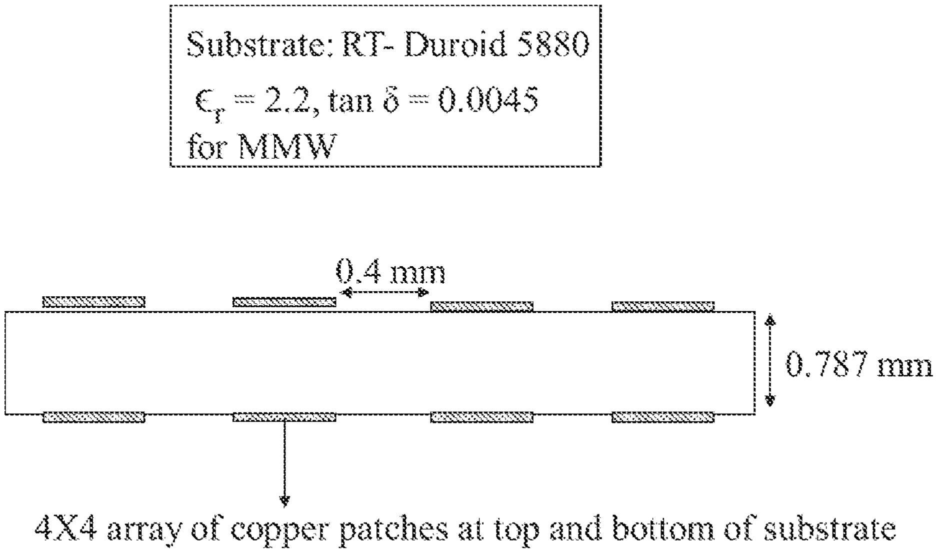

The MMW frequency antenna scanning system 100 further comprises a metasurface 108, disposed such that a center point of the metasurface 108 is at a second predetermined distance, along a Z-axis in the Cartesian coordinate system, from a radiating face of the microstrip antenna 102. FIG. 2A and FIG. 2B illustrate an exemplary representation (Not to scale) of a top view and a side view, respectively of a metasurface 108 consisting of a periodic arrangement of unit cells according to some embodiments of the present disclosure. The dimensions illustrated are representative of an exemplary embodiment and $\in_r$ represents relative permittivity while tan δ represents dielectric loss tangent respectively. In an embodiment, the metasurface 108 is square shaped. The optimized metasurface is finalized after performing many parametric iterations on the dimensions and number of unit cells.

The metasurface 108 rests on two or more posts 110 positioned on opposite sides of the first conducting plate 106. Accordingly, in an embodiment, the MMW frequency antenna scanning system 100 comprises the two or more posts 110 having a first end and a second end, positioned on opposite sides of the first conducting plate 106, wherein the first end is coupled to the metasurface 108, and configured to have vertical movement along the Z-axis. In an embodiment, the two or more posts 110 are made of an insulating material such as Polytetrafluoroethylene (PTFE), Bakelite, and the like. In an embodiment employing two posts, the first end of each post is coupled to a midpoint of opposite sides of the metasurface. Alternatively, in an embodiment employing four posts, the first end of each post is coupled to a midpoint of each side of the metasurface.

The MMW frequency antenna scanning system 100 further comprises a controller unit 112 that is in communication with the two or more posts 110 via the second end of the two or more posts. In an embodiment, the controller unit 112 comprises two or more motors 112A, wherein each of the two or more motors 112A are configured to independently control the vertical movement of an associated post from the two or more posts 110 along the Z-axis, such that the vertical movement results in a tilt of the connected metasurface 108 with reference to an orientation of the microstrip antenna 102. In an embodiment, the two or more motors 112A are Direct Current (DC) motors such as stepper motors.

The controller unit 112 further comprises one or more data storage devices or memory 112B configured to store instructions; one or more communication interfaces 112C; and one or more hardware processors 112D operatively coupled to the one or more data storage devices via the one or more communication interfaces 112C, wherein the one or more hardware processors 112D are configured by the instructions to perform beam steering.

The one or more hardware processors 112D can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the one or more hardware processors 112D can be implemented in a variety of computing systems, such as laptop computers, notebooks, hand-held devices, workstations, mainframe computers, servers, a network cloud and the like.

In an embodiment, the communication interface(s) or input/output (I/O) interface(s) 112C may include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The one or more data storage devices or memory 1128 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the one or more hardware processors 112D are configured to generate a driving voltage for synchronously controlling the two or more motors 112A such that the coupled metasurface 108 tilts with reference to the orientation of the microstrip antenna 102 by an inclination angle for beam steering that provides a predetermined directivity to the microstrip antenna, wherein the beam steering involves steering of beams of the radio waves. In an embodiment, the predetermined directivity (degree to which the radio wave is transmitted/received is concentrated in a single direction) is empirically determined. In accordance with the present disclosure, the inclination angle is identical to an angle of tilt $\theta$ of a main lobe of a transmitted or received radio waves from the microstrip antenna 102.

In an embodiment, the first predetermined distance and the second predetermined distance are optimized based on impedance matching, radiation gain and accuracy of the beam steering. The antenna's input impedance matching with corresponding RF circuitry's output impedance is critical to minimize reflection of the radio waves or maximize power transfer. Best performance may be assessed empirically and accordingly the first predetermined distance and the second predetermined distance may be determined.

In an embodiment, the first predetermined distance is based on domain knowledge pertaining to cavity antenna. Accordingly, the first predetermined distance is based on a wavelength ($\lambda$) corresponding to a frequency of interest. In an embodiment, for the frequency of interest 28 GHz, $\lambda$ is 10.7 mm. In an embodiment, the first predetermined distance is an odd multiple of $\lambda/4$, for instance, 3 $\lambda/4$ or 5 $\lambda/4$, and the like.

In an embodiment of the present disclosure, the second predetermined distance is empirically determined as 8 millimeter (mm). This is further explained under Experimental evaluation with reference to Table 2 later in the description.

Figure 3A:
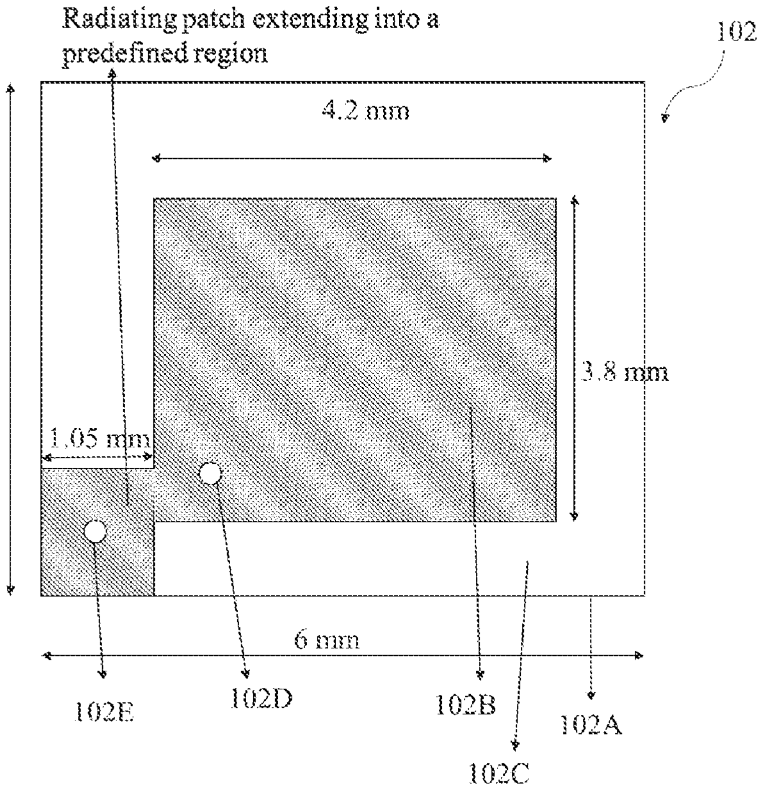
FIG. 3A and FIG. 3B illustrate an exemplary representation (Not to scale) of a top view and a side view, respectively of a microstrip antenna in accordance with some embodiments of the present disclosure.
Figure 3B:
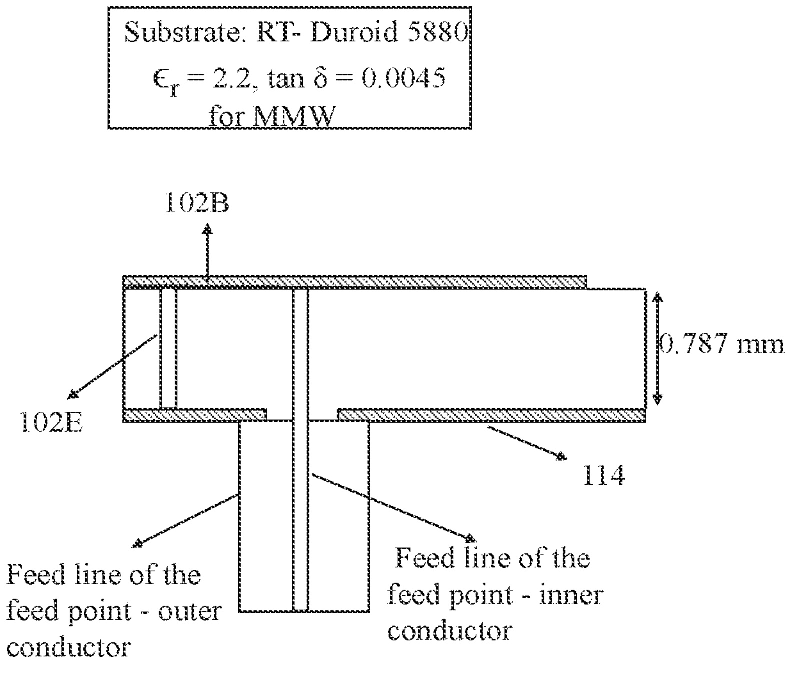

FIG. 3A and FIG. 3B illustrate an exemplary representation (Not to scale) of a top view and a side view, respectively of a microstrip antenna 102 in accordance with some embodiments of the present disclosure. The dimensions illustrated are representative of an exemplary embodiment and $\in_r$ represents relative permittivity while tan $\delta$ represents dielectric loss tangent respectively. In an embodiment, the microstrip antenna 102 is characterized by a substrate 102A that accommodates a radiating patch 102B on a first surface and a second conducting plate 114 on an opposite surface. In an embodiment, the radiating patch 102B is copper material. A predefined region 102C separates sides of the radiating patch 102B from the sides of the substrate 102A. A portion of a side of the radiating patch 102B proximate a corner (bottom left corner in the illustrated embodiment) of the radiating patch 102B and extends into the predefined region 102C along two adjacent sides of the substrate 102A, proximate the corner. A feed point 102D is disposed at an empirically determined position (e.g. 1.2, −1, 0.787 mm) in the radiating patch 102B. A shorting pin 102E is disposed at an empirically determined position (e.g. 2.2, −2.5, 0.787 mm) in a portion of the radiating patch 102B that extends into the predefined region 102C. In an embodiment, the feed point 102D and the shorting pin 102E may have the same diameter (e.g. 0.8 mm). The configuration of the microstrip antenna 102 as explained above enables catering of more than 10% bandwidth in spite of the small size. In an embodiment, as illustrated, the substrate 102A is square shaped, and the radiating patch 102B is rectangular shaped.

Figure 4A:
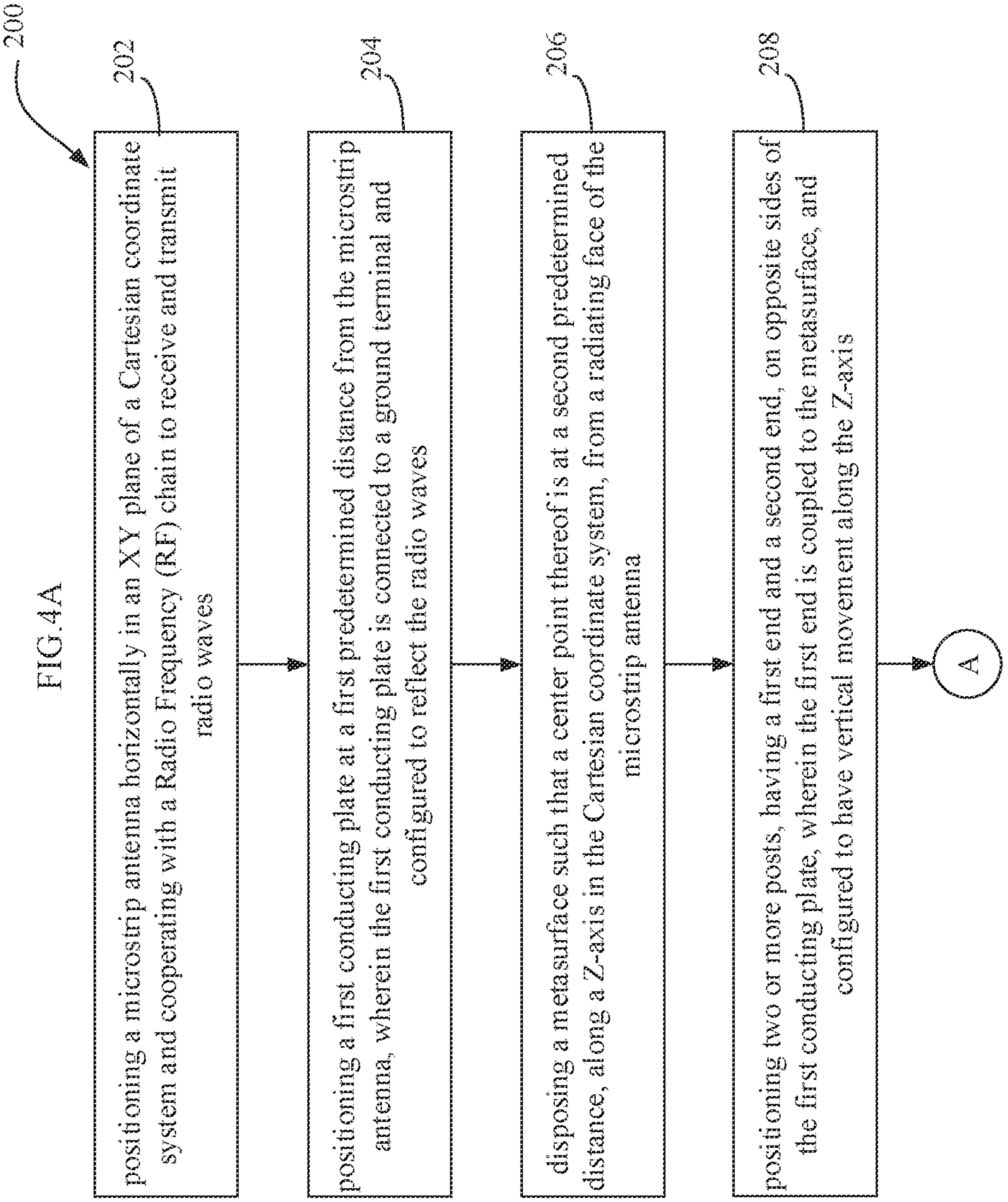
FIG. 4A and FIG. 4B are exemplary flow diagrams illustrating a computer implemented method for beam steering of a Millimeter Wave (MMW) frequency antenna scanning system, in accordance with an embodiment of the present disclosure.
Figure 4B:
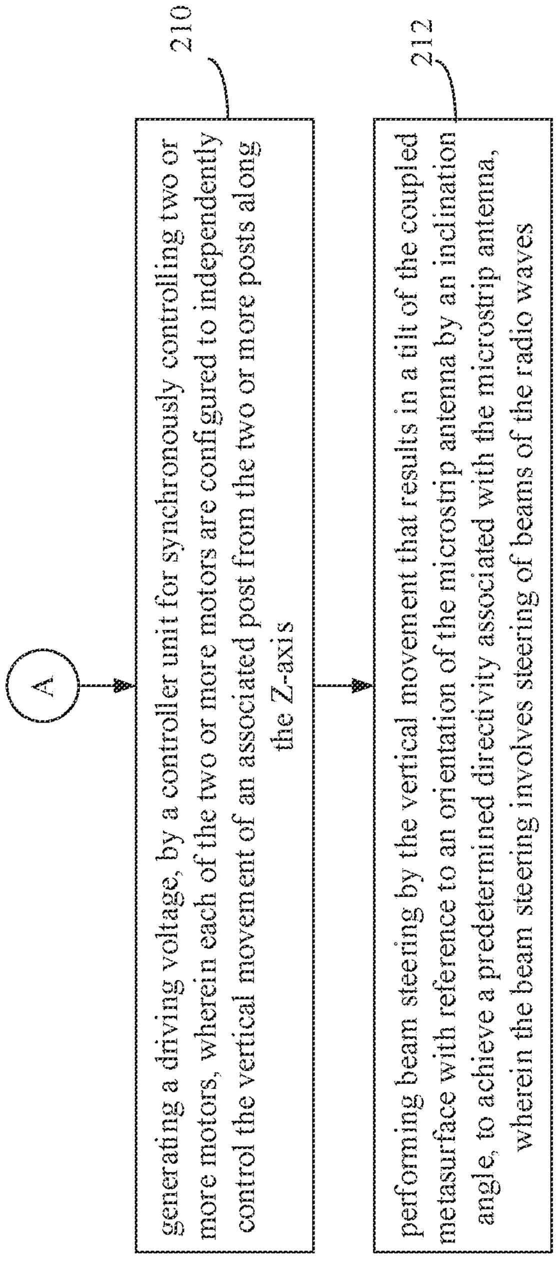

FIG. 4A through FIG. 4B is an exemplary flow diagram illustrating a computer implemented method for beam steering of a Millimeter Wave (MMW) frequency antenna scanning system, in accordance with an embodiment of the present disclosure. The steps of the method 200 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, the method 200 comprises, positioning the microstrip antenna 102 horizontally, in an XY plane of a Cartesian coordinate system, at step 202, such that the microstrip antenna 102 cooperates with a Radio Frequency (RF) chain 104 of the system 100 to receive and transmit the radio waves. The first conducting plate 106 is positioned at the first predetermined distance from the microstrip antenna 102, at step 204, wherein the first conducting plate 106 is connected to the ground terminal and configured to reflect the radio waves. The metasurface 108 is disposed, at step 206, such that the center point of the metasurface 108 is at the second predetermined distance, along the Z-axis in the Cartesian coordinate system, from the radiating face of the microstrip antenna 102. The two or more posts 110, having the first end and the second end, on opposite sides of the first conducting plate 106, are positioned at step 208, wherein the first end is coupled to the metasurface 108, and configured to have vertical movement along the Z-axis. The driving voltage is then generated, at step 210, by the controller unit 112 for synchronously controlling the two or more motors 112A, wherein each of the two or more motors are configured to independently control the vertical movement of an associated post from the two or more posts 110 along the Z-axis. Beam steering is performed, at step 212, by the vertical movement that results in a tilt of the coupled metasurface 108 with reference to an orientation of the microstrip antenna 102 by an inclination angle, to achieve a predetermined directivity associated with the microstrip antenna 102, wherein the beam steering involves steering of beams of the radio waves.

EXPERIMENTAL EVALUATION

Table 2 below shows beam steering characteristics of the MMW frequency antenna scanning system 100 for various values of separation between the metasurface 108 and the microstrip antenna 102 represented by the second predetermined distance I. The angle rotate represents the inclination angle of the metasurface 108 with respect to the horizontally placed microstrip antenna 102.

TABLE 2

| | Direction (θ) of peak beam for every angle rotate | | | | |
|---|---|---|---|---|---|
| I | rotate = 0° | rotate = 10° | rotate = 20° | rotate = 30° | rotate = 40° |
| 6 mm | −15° | 0° | 10° | 25° | 35° |
| 7 mm | −10° | 5° | 15° | 25° | 35° |
| 8 mm | −5° | 5° | 15° | 25° | 35° |
| 9 mm | −5° | 5° | 15° | 25° | 40° |

From Table 2, it may be noted that the second predetermined distance of 8 mm is optimum for which the beam is steered by the exact same angle as the metasurface inclination angle (rotate) while maintaining the same offset angle which appears due to the fact that when the metasurface 108 is horizontally placed (rotate=0°), the peak beam is directed towards −5° angle. Also, S11 is below −15 dB for the entire angle rotate (up to 40°). For the other values of the second predetermined distance, there is some error noted, thereby concluding that 8 mm is an optimum separation for which beam is steered (up to +/−40°) with no error as well as maintaining a good impedance matching (below −15 dB).

Figure 5:
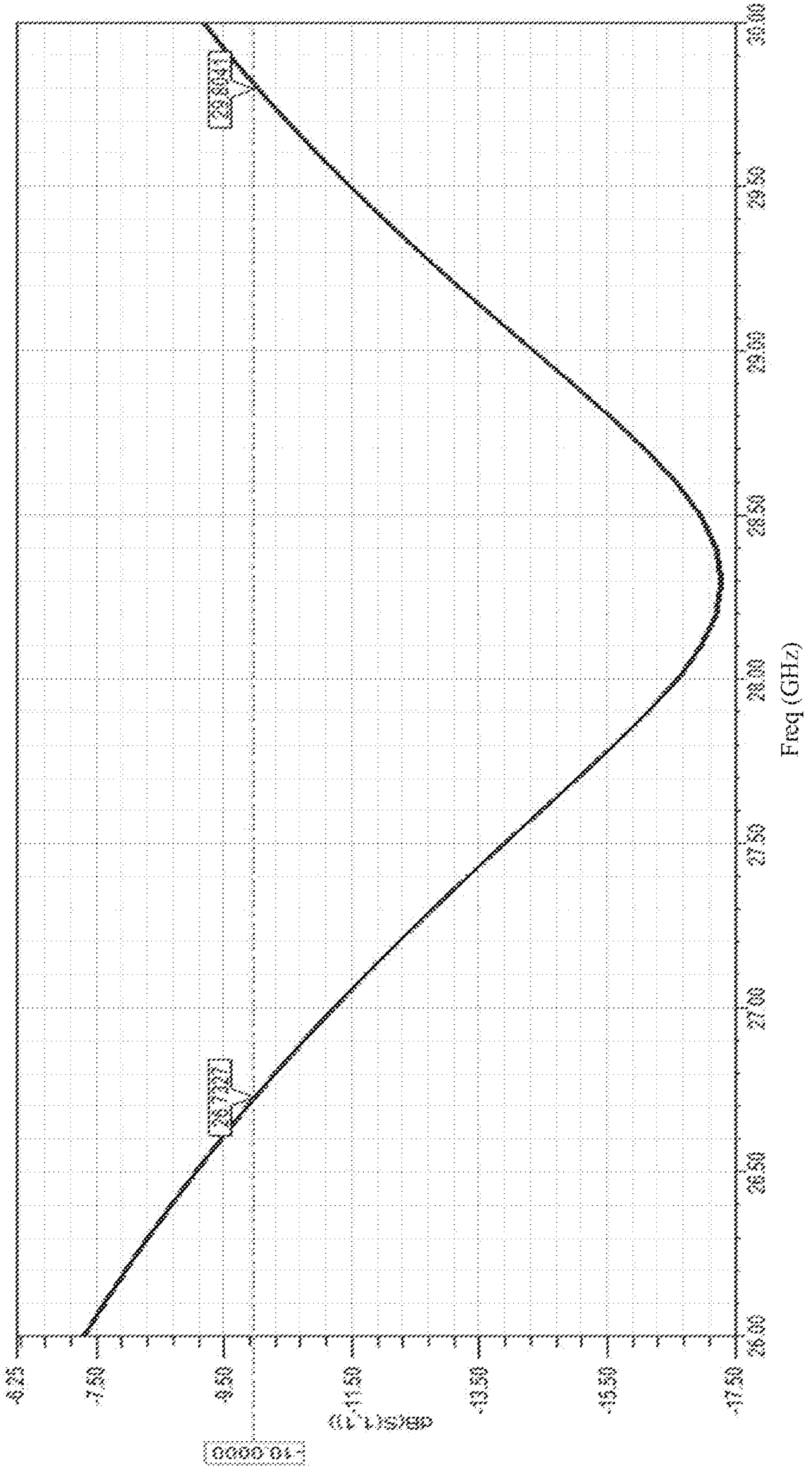
FIG. 5 is a Reflection Coefficient (S11) curve that illustrates broadband impedance matching (S11 below −10 dB) characteristics of the microstrip antenna in MMW frequency range.

The MMW frequency antenna scanning system 100 of the present disclosure was simulated using Ansys HFSS for its reflection coefficient (S11) curve to study impedance matching characteristics. FIG. 5 is a Reflection Coefficient (S11) curve that illustrates broadband impedance matching (S11 below −10 dB) characteristics of the microstrip antenna 102 in MMW frequency range. From FIG. 5, it may be noted that the S11 is below −10 dB over the span of 26.73-29.80 GHz with a resonant frequency of 28.3 GHz. The value of S11 even at 28 GHz is below −15 dB.

Figure 6:
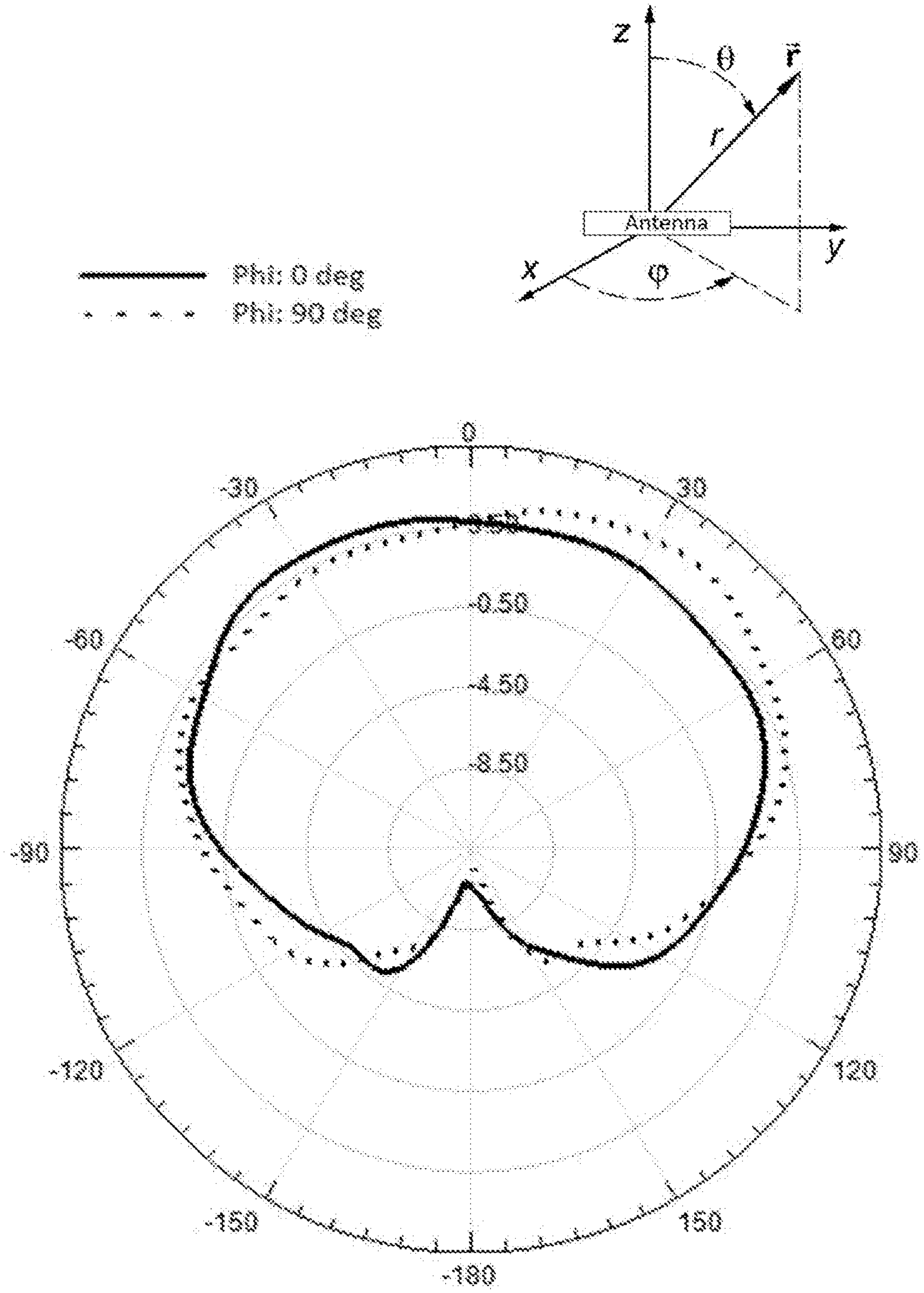
FIG. 6 is a 2-Dimensional radiation pattern of the microstrip antenna according to some embodiments of the present disclosure.

FIG. 6 is a 2-Dimensional radiation pattern of the microstrip antenna 102 according to some embodiments of the present disclosure. Radiation gain of the microstrip antenna 102 placed horizontally in the x-y plane, has been depicted as a function of the angle tilt θ of the main lobe of the transmitted or received radio waves from the microstrip antenna 102. The radiation pattern has been plotted for both φ equals 0° and 90° plane. The spherical coordinates are:

Radius, r: vector length from origin to point of interest.

Polar angle, θ: angle between the vector and positive z-axis.

Azimuth, φ: angle between the vector's projection onto the x-y plane and the positive x-axis.

In the radiation plot, the numerical values distributed over the outermost circle represents the angle θ and the numerical values (vertically arranged) mentioned at the circumference of each inner circle represent the radiation gain value in dB. It may be noted from FIG. 6 that the microstrip antenna 102 of the present disclosure radiates near omnidirectional pattern (@ frequency 28 GHz) having a good gain (gain is about 3.76 dB for angle of tilt θ of the main lobe of a transmitted beam equals 0°).

Figure 7:
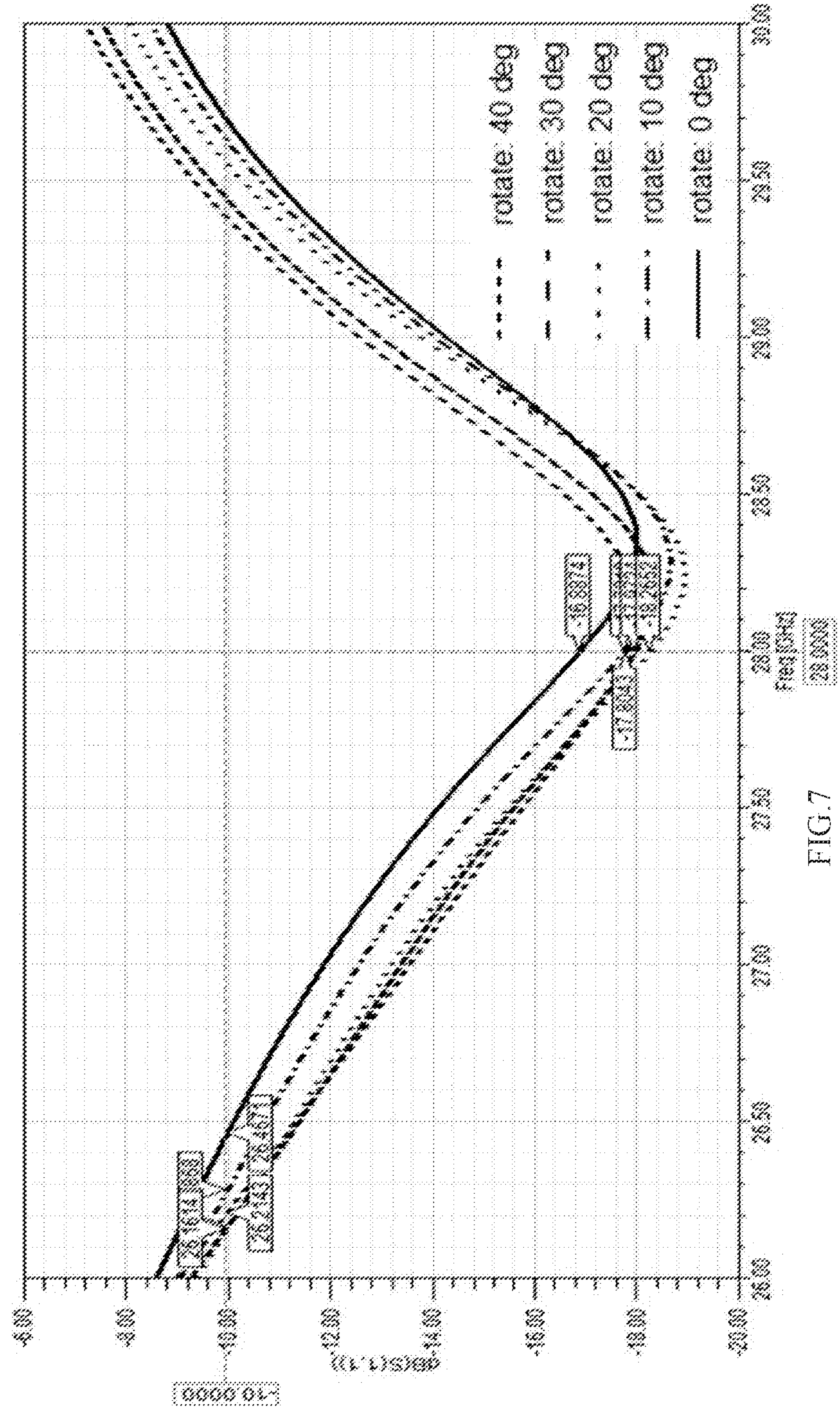
FIG. 7 illustrates the S11 plots for the microstrip antenna having various values of inclination angle of metasurface, according to some embodiments of the present disclosure.

FIG. 7 illustrates the S11 plots for the microstrip antenna 102 having various values of inclination angle of the metasurface 108, according to some embodiments of the present disclosure. It may be noted that the impedance matching is good (S11 below −15 dB) for each value of inclination angle.

Figure 8:
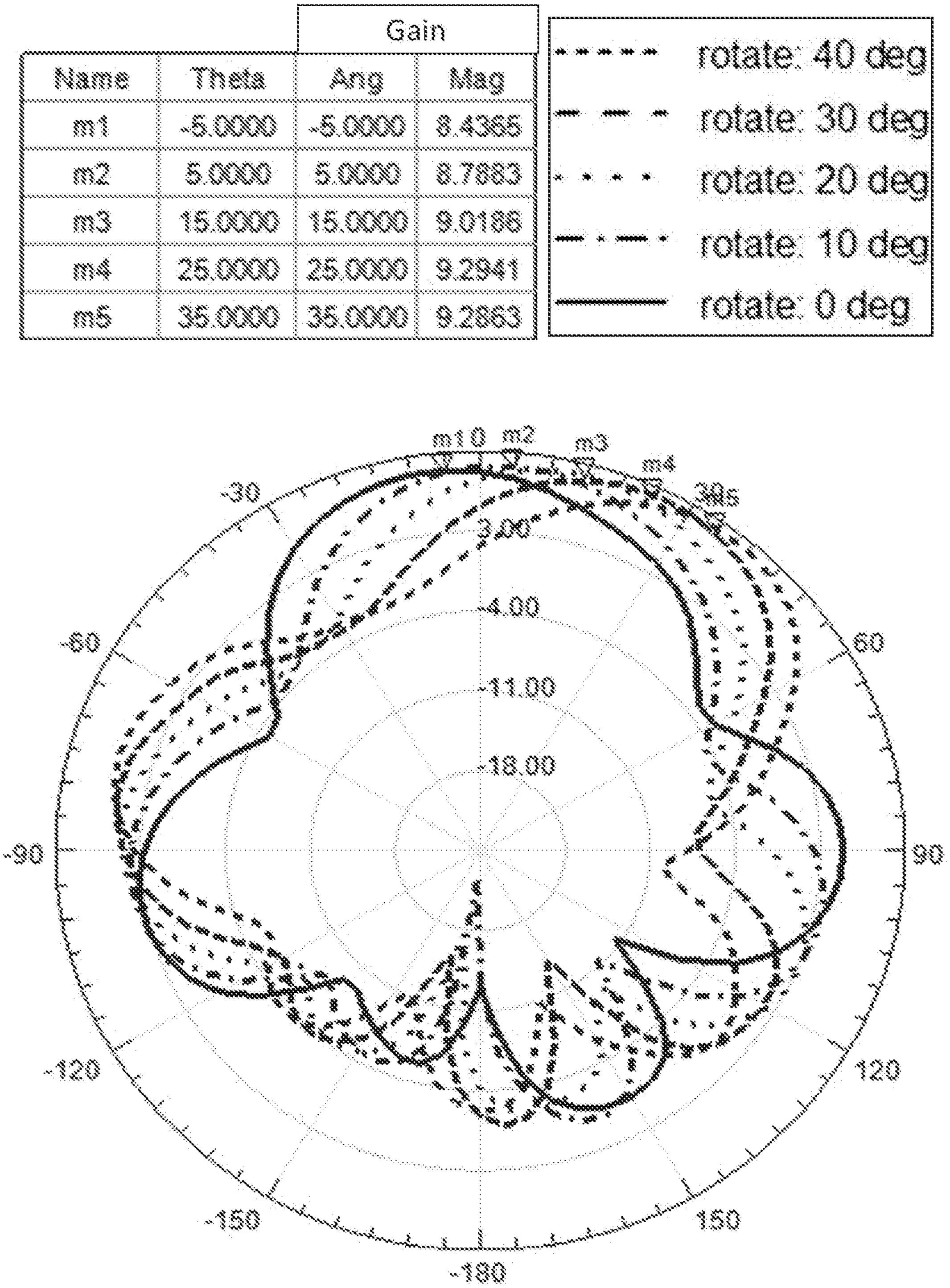
FIG. 8 is a 2-Dimensional radiation pattern of the microstrip antenna for various values of inclination angle of metasurface, according to some embodiments of the present disclosure.

FIG. 8 is a 2-Dimensional radiation pattern of the microstrip antenna 102 for various values of inclination angle of the metasurface 108, according to some embodiments of the present disclosure. The 2-D radiation pattern of antenna with the metasurface (for φ=90° plane) has been shown for various values of the inclination angle of the metasurface 108, which clearly illustrates that the metasurface 108 is able to drag the beam towards itself. The expressions 'ang' and 'mag' depicted in the figure represent angle and magnitude respectively, associated with the gain in the radiation pattern plot.

To clearly understand the beam steering behavior, different marker points have been placed at the peak point of the main beam corresponding to every inclination angle of the metasurface 108 so that the marker value can clearly notate the angle θ by which the beam has steered. Markers m1, m2, m3, m4 and m5 correspond to mark the peak of main beam for the inclination angle 0°, 10°, 20°, 30° and 40° respectively. The second predetermined distance between the microstrip antenna 102 and the metasurface 108 is fixed at 8 mm irrespective of the inclination angle.

For rotate=0°, it means the metasurface 108 is placed horizontally above the microstrip antenna 102 at 8 mm distance, the peak beam is lying at θ=−5 deg. The beam corresponding to this setup is considered as the reference beam.

For rotate=10°, it means that the metasurface 108 is inclined (towards the Y-axis) by an angle 10° w.r.t the vertical Z-axis, the peak beam lying at θ=5°. Here, it is observed that the peak beam (corresponding to 10° rotate) got steered with the same angle (10°) as that of the metasurface inclination angle.

For rotate=20°, it means that the metasurface 108 is inclined (towards the Y-axis) by an angle 20° w.r.t the vertical Z-axis, the peak beam lying at θ=15°. Here, it is observed that the peak beam got steered w.r.t the reference beam with the same angle) (20°) as that of metasurface inclination angle.

For rotate=30°, it means that metasurface 108 is inclined (towards the Y-axis) by an angle 30° w.r.t the vertical Z-axis, the peak beam lying at θ=25°. Here, it is observed that the peak beam got steered w.r.t the reference beam with the same angle) (30°) as that of the metasurface inclination angle.

For rotate=40°, it means that metasurface 108 is inclined (towards the Y-axis) by an angle 40° w.r.t the vertical Z-axis, the peak beam lying at θ=35°. Here, it is observed that the peak beam got steered w.r.t the reference beam with the same angle) (40°) as that of the metasurface inclination angle.

Therefore, concluding the above facts, the main beam is getting steered with the same angle as that of metasurface inclination angle.

It may be noted that the beam steering is happening only in φ=90° plane because the metasurface 108 is allowed to incline towards the Y-axis. Similarly, if the metasurface 108 is allowed to incline towards the X-axis, then the beam steering behavior will be observed for φ=0° plane.

Figure 9:
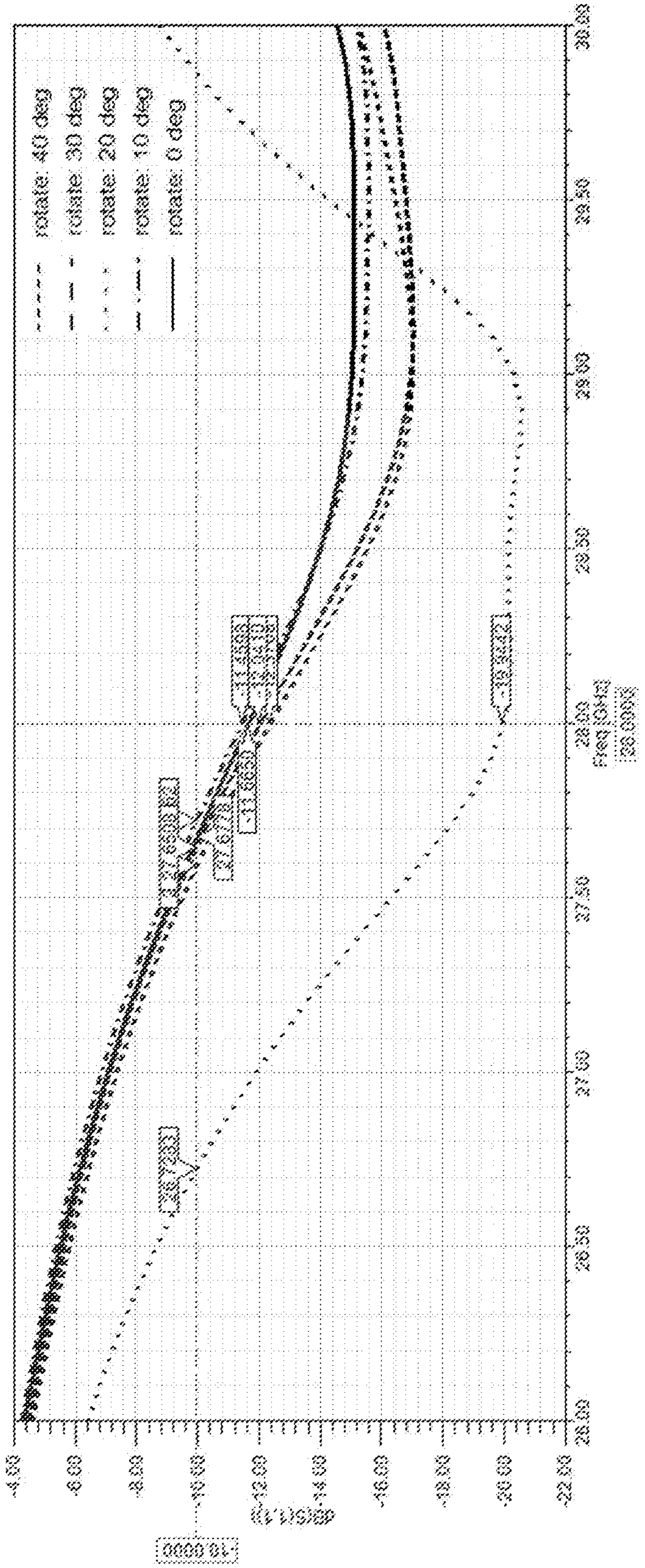
FIG. 9 illustrates the S11 plots for the microstrip antenna having various values of inclination angle of metasurface, when the metasurface is disposed at a distance of 4 millimeter (mm) from a radiating face of the microstrip antenna, according to some embodiments of the present disclosure.

FIG. 9 illustrates the S11 plots for the microstrip antenna 102 having various values of inclination angle of metasurface, when the metasurface is disposed at a distance of 4 millimeter (mm) from a radiating face of the microstrip antenna, according to some embodiments of the present disclosure.

When the metasurface 108 was placed on top of the microstrip antenna 102 at a distance of 4 mm then S11 lies between −10 dB and −15 dB at frequency of interest 28 GHz for various inclination angles of the metasurface 108, which does not match the requirement (S11≤−15 dB as desired in MMW applications). Considering this requirement, the S11 dip illustrates not a good matching except for inclination angle of 20°.

Figure 10:
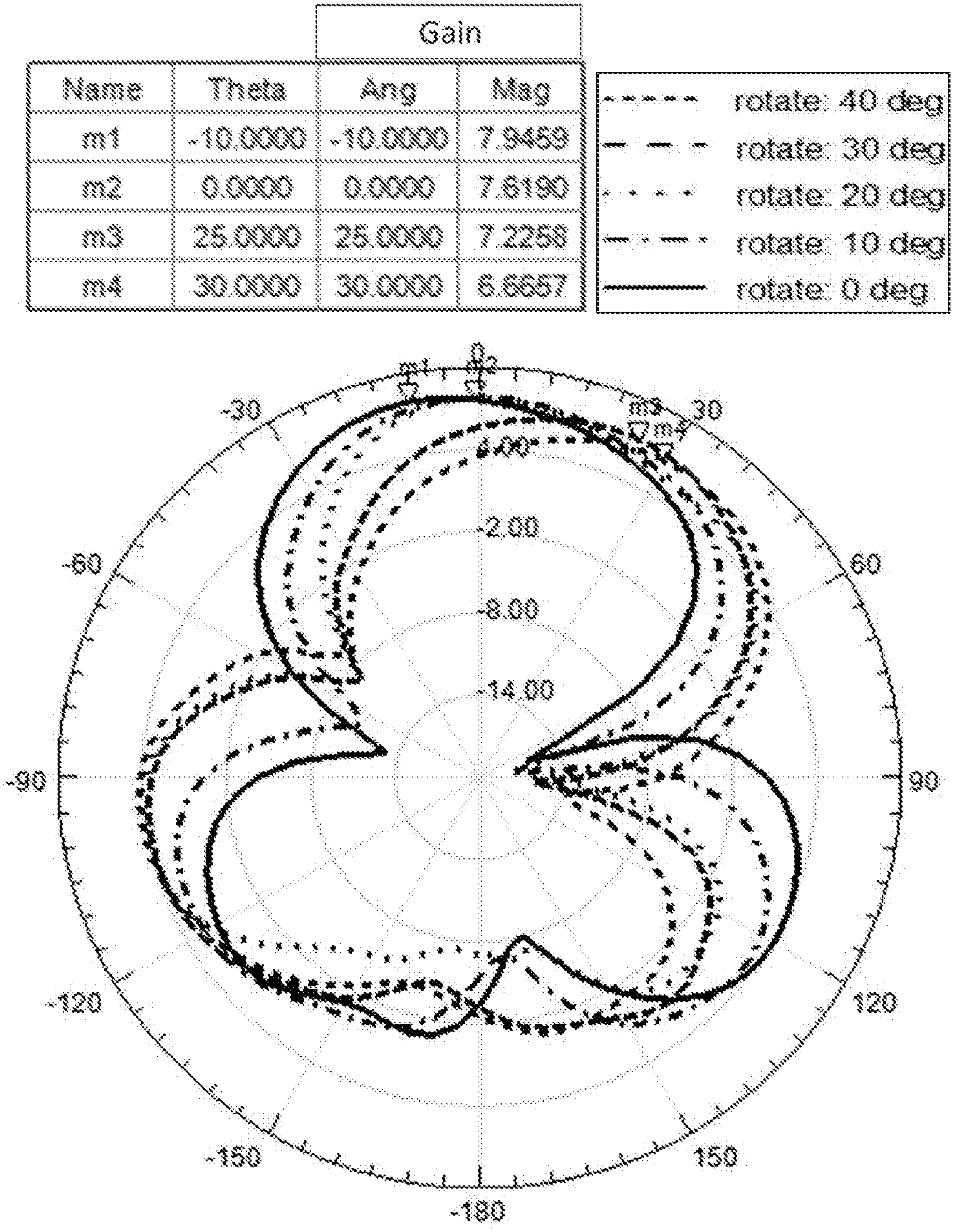
FIG. 10 is a 2-Dimensional radiation pattern of the microstrip antenna for various values of inclination angle of metasurface, when the metasurface is disposed at a distance of 4 millimeter (mm) from a radiating face of the microstrip antenna, according to some embodiments of the present disclosure.

FIG. 10 is a 2-Dimensional radiation pattern of the microstrip antenna 102 for various values of inclination angle of metasurface, when the metasurface 108 is disposed at a distance of 4 millimeter (mm) from the radiating face of the microstrip antenna 102, according to some embodiments of the present disclosure. The expressions 'ang' and 'mag' depicted in the figure represent angle and magnitude respectively, associated with the gain in the radiation pattern plot. The peak points of the radiation pattern have been marked by markers m1, m2, m3 and m4. It has been observed that the two peak points, corresponding to the radiation pattern for inclination angle 10° and 20°, coincided at the same point marked by m2. Also, the rest of the beam are not getting steered in a good manner as expected.

Hence, in accordance with the present disclosure, the separation between antenna and metasurface (the second predetermined distance) was optimized to get the S11 dip (@28 GHz) below −15 dB for every inclination angle of the metasurface 108. Also, the beam needs to get steered with the same angle as that of angle rotate. The optimized second predetermined distance which fulfills both these criteria is 8 mm. Hence, only the intrinsic property of the metasurface 108 is not sufficient enough to achieve beam steering as desired for MMW applications. It also depends upon the design of the microstrip antenna 102 provided in the present disclosure along with the optimization of the distance between the microstrip antenna 102 and the metasurface 108 in the MMW frequency antenna scanning system 100. The computer controlled electromechanical system 100 thus provides a cost effective and compact MMW frequency antenna scanning system with desired beam steering.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A Millimeter Wave (MMW) frequency antenna scanning system comprising:

a microstrip antenna positioned horizontally in an XY plane of a Cartesian coordinate system and cooperating with a Radio Frequency (RF) chain to receive and transmit radio waves;

a first conducting plate positioned at a first predetermined distance from the microstrip antenna, wherein the first conducting plate is connected to a ground terminal and configured to reflect the radio waves;

a metasurface disposed such that a center point thereof is at a second predetermined distance, along a Z-axis in the Cartesian coordinate system, from a radiating face of the microstrip antenna;

two or more posts having a first end and a second end, positioned on opposite sides of the first conducting plate, wherein the first end is coupled to the metasurface, and configured to have vertical movement along the Z-axis; and a controller unit in communication with the two or more posts via the second end thereof, wherein the controller unit comprises:

two or more motors, wherein each of the two or more motors are configured to independently control the vertical movement of an associated post from the two or more posts along the Z-axis, such that the vertical movement results in a tilt of the connected metasurface with reference to an orientation of the microstrip antenna; and one or more data storage devices configured to store instructions;

one or more communication interfaces; and one or more hardware processors operatively coupled to the one or more data storage devices via the one or more communication interfaces, wherein the one or more hardware processors are configured by the instructions to:

generate a driving voltage for synchronously controlling the two or more motors such that the coupled metasurface tilts with reference to the orientation of the microstrip antenna by an inclination angle for beam steering that provides a predetermined directivity to the microstrip antenna, wherein the beam steering involves steering of beams of the radio waves.

2. The MMW frequency antenna scanning system of claim 1, wherein the first predetermined distance and the second predetermined distance are optimized based on impedance matching, radiation gain and accuracy of the beam steering.

3. The MMW frequency antenna scanning system of claim 1, wherein the first predetermined distance is based on a wavelength (λ) corresponding to a frequency of interest and the second predetermined distance is 8 millimeter (mm).

4. The MMW frequency antenna scanning system of claim 3, wherein the first predetermined distance is an odd multiple of λ/4.

5. The MMW frequency antenna scanning system of claim 1, wherein the inclination angle is identical to an angle of tilt θ of a main lobe of a transmitted or received radio waves from the microstrip antenna.

6. The MMW frequency antenna scanning system of claim 1, wherein the metasurface is square shaped.

7. The MMW frequency antenna scanning system of claim 1, wherein the microstrip antenna is characterized by:

a substrate that accommodates a radiating patch on a first surface and a second conducting plate on an opposite surface;

sides of the radiating patch and sides of the substrate are separated by a predefined region;

a portion of a side of the radiating patch proximate a corner of the radiating patch and extends into the predefined region along two adjacent sides of the substrate, proximate the corner;

a feed point disposed at an empirically determined position in the radiating patch; and a shorting pin disposed at an empirically determined position in a portion of the radiating patch that extends into the predefined region.

8. The MMW frequency antenna scanning system of claim 7, wherein the substrate is square shaped, and the radiating patch is rectangular shaped.

9. The MMW frequency antenna scanning system of claim 1, wherein the two or more motors are stepper motors.

10. A processor implemented method comprising the steps of:

positioning a microstrip antenna horizontally, in an XY plane of a Cartesian coordinate system, and cooperating with a Radio Frequency (RF) chain to receive and transmit radio waves;

positioning a first conducting plate at a first predetermined distance from the microstrip antenna, wherein the first conducting plate is connected to a ground terminal and configured to reflect the radio waves;

disposing a metasurface such that a center point thereof is at a second predetermined distance, along a Z-axis in the Cartesian coordinate system, from a radiating face of the microstrip antenna;

positioning two or more posts, having a first end and a second end, on opposite sides of the first conducting plate, wherein the first end is coupled to the metasurface, and configured to have vertical movement along the Z-axis;

generating a driving voltage, by a controller unit for synchronously controlling two or more motors, wherein each of the two or more motors are configured to independently control the vertical movement of an associated post from the two or more posts along the Z-axis; and performing beam steering by the vertical movement that results in a tilt of the coupled metasurface with reference to an orientation of the microstrip antenna by an inclination angle, to achieve a predetermined directivity associated with the microstrip antenna, wherein the beam steering involves steering of beams of the radio waves.

11. The processor implemented method of claim 10, wherein the first predetermined distance and the second predetermined distance are optimized based on impedance matching, radiation gain and accuracy of the beam steering.

12. The processor implemented method of claim 10, wherein the first predetermined distance is based on a wavelength (λ) corresponding to a frequency of interest and the second predetermined distance is 8 millimeter (mm).

13. The processor implemented method of claim 12, wherein the first predetermined distance is an odd multiple of λ/4.

14. The processor implemented method of claim 10, wherein the inclination angle is identical to an angle of tilt θ of a main lobe of a transmitted or received radio waves from the microstrip antenna.

15. The processor implemented method of claim 10, wherein the metasurface is square shaped.

16. The processor implemented method of claim 10, wherein the microstrip antenna is characterized by:

a substrate that accommodates a radiating patch on a first surface and a second conducting plate on an opposite surface;

sides of the radiating patch and sides of the substrate are separated by a predefined region;

a portion of a side of the radiating patch proximate a corner of the radiating patch and extends into the predefined region along two adjacent sides of the substrate, proximate the corner;

a feed point disposed at an empirically determined position in the radiating patch; and a shorting pin disposed at an empirically determined position in a portion of the radiating patch that extends into the predefined region.

17. The processor implemented method of claim 16, wherein the substrate is square shaped, and the radiating patch is rectangular shaped.

18. The processor implemented method of claim 10, wherein the two or more motors are stepper motors.

* * * * *